July 7, 1959
R. D. EVANS
2,893,100
BLOCK MOLDING DEVICE
Filed Jan. 23, 1956
2 Sheets-Sheet 1
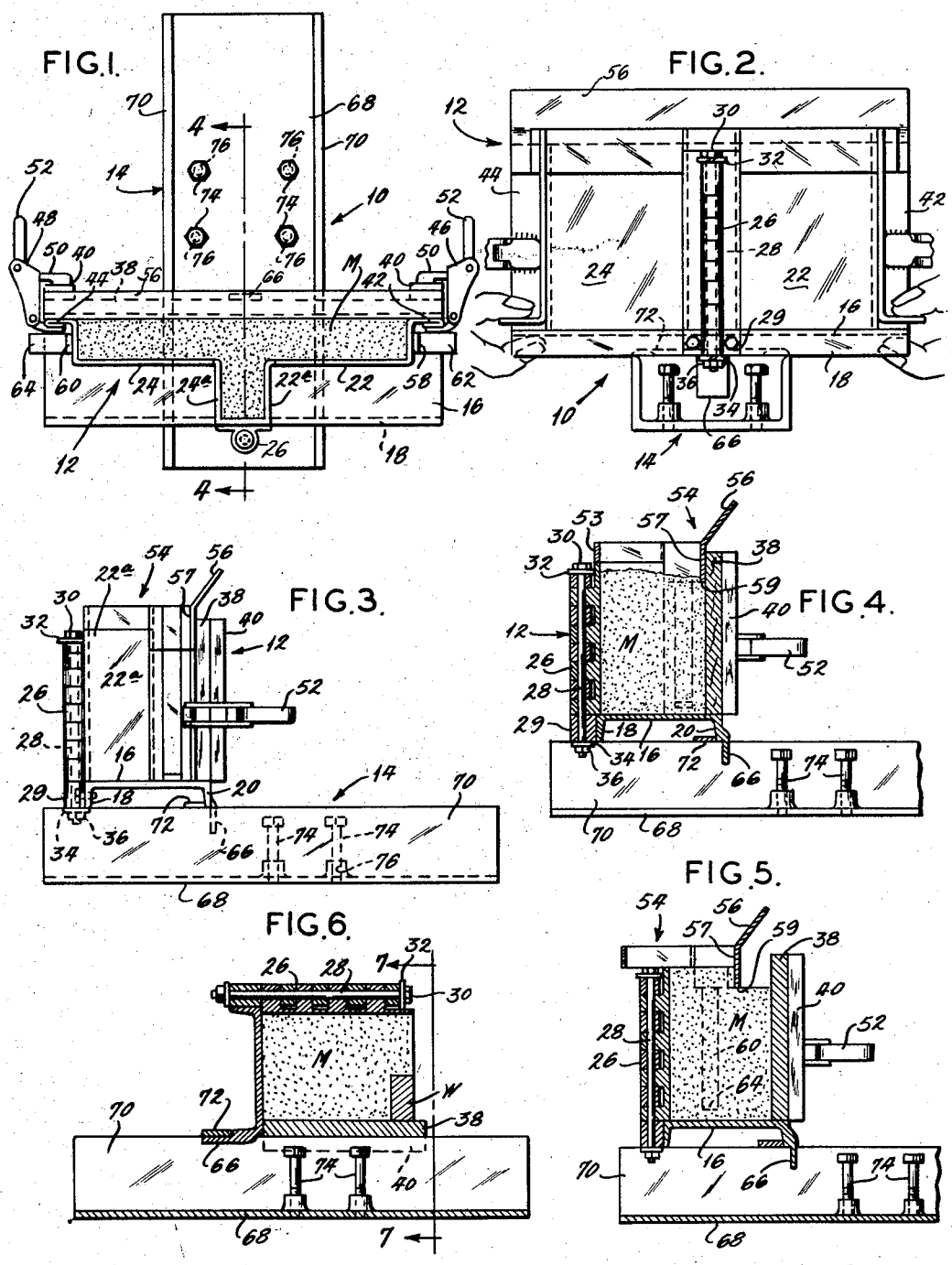
INVENTOR:
RICHARD D. EVANS
By Gravely, Lieder, Woodruff and Wille
ATTORNEYS.

July 7, 1959 R. D. EVANS 2,893,100
BLOCK MOLDING DEVICE
Filed Jan. 23, 1956 2 Sheets-Sheet 2
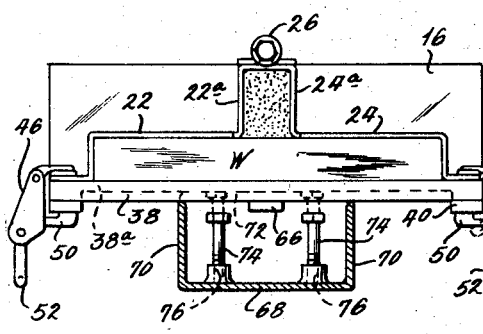
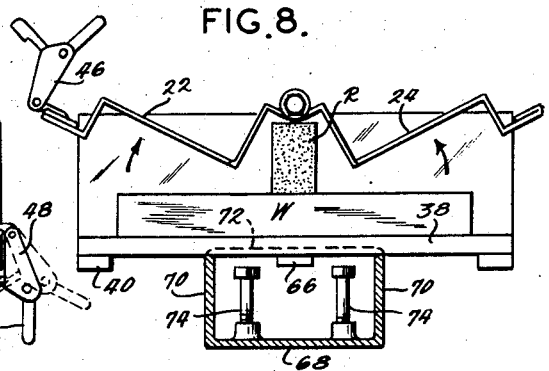
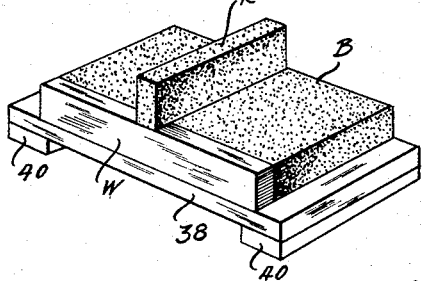
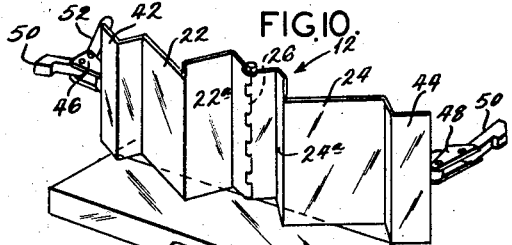
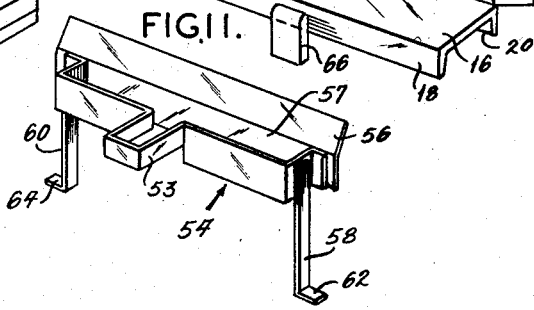
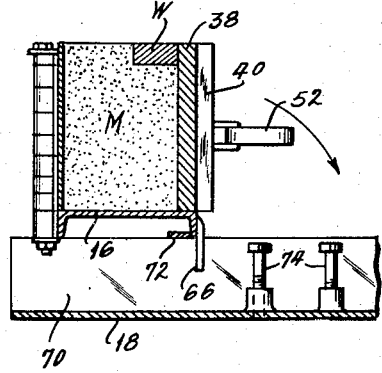
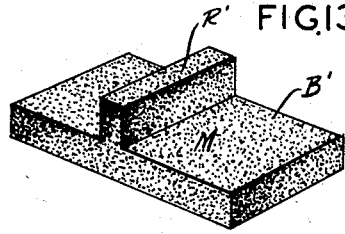
INVENTOR:
RICHARD D. EVANS
By Gravely, Lieder, Woodruff and Wills
ATTORNEYS.

United States Patent Office 2,893,100
Patented July 7, 1959

2,893,100

BLOCK MOLDING DEVICE

Richard D. Evans, Mehlville, Mo.

Application January 23, 1956, Serial No. 560,511

2 Claims. (Cl. 25—41)

The present invention relates generally to molding devices and more particularly to molding devices for casting building blocks and the like.

Prior block molding devices have been constructed but these known devices have made no provision for overturning the mold portion thereof through an angle of 90 degrees after a block has been formed therein, and which enables the mold portion to be removed from the freshly formed block without the possibility of damage resulting therefrom.

It is an object of the present invention to provide means in a block molding device for preventing damage to freshly formed blocks when the mold members are removed therefrom.

Another object of the invention is to provide a block molding device in which the mold members are overturned through 90 degrees from an upstanding position in going from the block forming to the block storing position.

Another object of the present invention is to provide a block molding device that uses a block storage pallet as one wall of the mold cavity.

Another object of the invention is to provide a block molding device that is inexpensive to construct and which can be used efficiently by unskilled persons to form various shaped building blocks.

Another object of the invention is to provide a block molding device that can be accurately prefilled with mortar or the like taking into account the shrinkage that results due to settling.

Another object of the invention is to provide a block molding device that reduces to a minimum the amount of material that is lost through spilling.

Another object of the invention is to provide a block molding device whose operation is not hampered by the accumulation of mold material or other foreign matter on the various parts thereof.

Still another object of the invention is to provide a block molding device that is fully portable and of lightweight construction and which provides maximum flexibility in the shape of the blocks that can be made therewith.

Other objects and advantages of the invention will become apparent after considering the specification and the drawings.

Briefly, the present invention comprises a stationary horizontal support member and a movable block molding portion positioned thereon, said molding portion including a platform and hinged mold walls attached thereto, said mold portion being movable between an upstanding position on the support member for forming blocks and an overturned position thereon for removing the mold portion from the formed blocks. The invention further resides in a funnel member adapted to be supported on the mold portion for measuring and confining an excess volume of molding material in the mold portion.

In the drawings:

Fig. 1 is a top view of a block molding device constructed according to the present invention and showing the mold portion thereof in the upstanding position, Fig. 2 is a front elevational view of the block molding device of Fig. 1, Fig. 3 is a side elevational view of the same block molding device, Fig. 4 is a cross-sectional side elevational view taken along the line 4—4 of Fig. 1, Fig. 5 is a view similar to Fig. 4 but showing the funnel portion thereof during a scraping operation, Fig. 6 is a cross-sectional side elevational view of the inventive block molding device showing the mold portion thereof in an overturned position, Fig. 7 is a rear view, partly in section, taken along the line 7—7 in Fig. 6, Fig. 8 is a rear view similar to the view in Fig. 7 showing the mold wall members after being separated from a formed block, Fig. 9 is a perspective view showing a molded block resting on a pallet, Fig. 10 is a perspective view of the mold portion of the inventive block molding device showing the mold walls thereof in an inoperative position, Fig. 11 is a perspective view of the funnel portion of the block molding device, Fig. 12 is a cross-sectional side elevational view of the block molding device showing the device in the condition just prior to being overturned on its side, and Fig. 13 is a view of a different shape of block constructed by a modified block molding device.

Referring now to the figures by reference numbers, the number 10 refers to a block molding device constructed according to the teachings of the present invention. The inventive block molding device includes a movable mold portion 12 and a stationary support portion 14.

The mold portion 12 is positioned on the support portion 14 and includes a platform 16 which is integral with a front flange 18 and a rear flange 20. The front and rear flanges 18 and 20 extend downwardly from the platform 16 and are positioned crosswise on the support portion 14. Extending upwardly from the platform 16 are two mold walls, the right mold wall (Figs. 1 and 2) being designated 22 and the left mold wall being designated 24. Each of the mold walls 22 and 24 is attached along one side to a piano-type hinge 26 so that the adjacent edges form a smooth surface at the hinge 26 when positioned for forming a block. The hinge 26 including a hinge pin 28 is mounted in an upstanding position on the front flange 18 by member 29. The mold walls 22 and 24 are rotatable about the hinge pin 28 and the bottom edges thereof traverse the face of the platform 16 closely adjacent thereto. The top of the hinge pin 28 is provided with a wrench head 30 and a washer 32 and the bottom is threaded and is provided with another washer 34 and a lock nut 36. This construction makes it easy to swing the mold walls 22 and 24 about the hinge pin 28 and prevents displacement of the mold walls 22 and 24 away from the platform 16. The construction also prevents foreign matter from working into the hinge 26 and binding the hinge pin 28.

A preferred shape of the mold walls 22 and 24 is shown in the drawings. In the top view of the device shown in Fig. 1, the mold walls 22 and 24 are shown in position for forming a block. In this position the walls form a T shaped cavity with a pallet 38. In front and side view (Figs. 2 and 3) the mold walls 22 and 24 have portions 22a and 24a respectively (which form the walls for the stem of the T shaped cavity) which extend upwardly further than the balance of the mold walls 22 and 24. The increased height of the portions 22a and 24a is important to the operation of the preferred construction described herein but may be eliminated so as to have a flat or level top for forming different shaped blocks as will be explained hereafter.

The blocks B formed by the mold portion 12 have a large rectangular body portion and a rib R extending transversely across one side of the body portion. The rib R is formed by the two surfaces of the walls 22a and 24a. Fig. 9 shows a block B having a rib R that protrudes beyond one side thereof. Fig. 13 shows a block B' formed with a modified molding device in which the rib R' terminates at both ends even with the sides of the block B'.

One of the pallets 38 is provided for each block that is molded. The pallets 38 consist of a rectangular shaped board having smaller boards or legs 40 attached to one side adjacent the ends thereof (Fig. 9). The pallet 38 is positioned in an upstanding position on one edge during the block forming operation (Figs. 1, 2, 3, 4 and 5). In this position the mold walls 22 and 24, which include integral outwardly extending flanges 42 and 44 are in the positions shown in Fig. 1 with the flanges 42 and 44 abutting the end portions of the pallet 38. It is now obvious that the pallet 38 forms one wall of the mold cavity, the other walls being formed by the mold walls 22 and 24 and by the platform 16.

The outwardly extending flanges 42 and 44 are reinforced by turning a portion thereof back on themselves to form cleats. An eccentric clamp element 46 or 48 is attached to each of the cleated flanges 42 and 44 respectively. The clamp elements 46 and 48 include clamping arms 50 and hand operated levers 52 and are movable around the ends of the pallet 38 for clamping the pallet 38 to the flanges 42 and 44.

A funnel member 54 (Fig. 11) is positioned on top of the mold portion 12 while the mold cavity is being filled with mortar M or like material. The funnel member 54 is provided with a tapered upper flange 56 integral with a vertical wall 57. The tapered flange 56 makes it easy to fill the mold cavity with mortar M. The horizontal cross sectional shape of the funnel member 54 is of the same shape as the mold cavity and when in position the lower edge thereof coincides with the upper edge of the mold walls 22 and 24. The funnel member 54 (Fig. 11) is constructed for use with mold walls 22 and 24 that have the higher portions 22a and 24a. Therefore, it is necessary to cut away a section of projecting portion 53 to permit the funnel member 54 to coincide with the upper contour of the mold wall portions 22a and 24a. In addition to making it easy to fill the mold cavity, the funnel member 54 also enables the operator to overfill the mold cavity so as to take into account the loss of mortar volume due to settling.

The ends of the funnel member 54 are provided with downwardly extending arms 58 and 60. When the funnel member 54 is in position on the mold walls 22 and 24, the arms 58 and 60 extend downwardly to within a short distance of the platform 16. The lower ends of the arms 58 and 60 are provided with outwardly extending flanges 62 and 64 respectively. The flanges 62 and 64 are positioned so that a person placing his fingers beneath the platform 16 (from the ends) can easily place his thumbs on the flanges 62 and 64 to hold the funnel member 54 in position while lifting and thumping the mold portion 12 and the mortar M contained therein.

The rearward flange 20 which is integral with the platform 16 is provided with a downwardly extending pivot stud 66, the purpose of which will be explained hereinafter. The support portion 14 of the block molding device 10 includes a base channel 68 having two upstanding side walls 70 extending in a front to rear direction along the edges thereof. A bridge member 72 is welded or otherwise fastened to the free edges of side walls 70 in a position as shown in Figs. 3 and 4. The pivot stud 66 is positioned so as to extend downwardly from the rear flange 20 into the space between the walls 70 when the mold portion 12 is in the upstanding position. When the mold portion is overturned 90 degrees, the pivot stud 66 engages the underside of the bridge member 72 and prevents the mold portion 12 from moving further than 90 degrees from the upstanding position. Therefore, since the mold portion 12 can not overturn more than 90 degrees it is obvious that the mold portion can not sink into or otherwise deform the freshly molded blocks when being removed therefrom.

Vertical posts 74 are threadedly positioned in bores 76 in the base of the channel 68 (Figs. 1 and 7). The purpose for the posts 74 will be described hereinafter in connection with the operation of the device.

Operation

Throughout the operation of the block molding device 10, the support portion 14 remains in a fixed horizontal position extending longitudinally away from the operator at about waist height (Fig. 2). The mold portion 12, on the other hand, is moved by the operator between two positions; the first being the upright position shown in Figs. 1, 2, 3, 4, 5 and 12, and the second being the overturned position with the mold portion 12 on its side and with the pallet 38 forming the base therefor.

The operation will be described considering the upstanding position first. The mold walls 22 and 24, when not clamped, are movable about the hinge pin 28 (Fig. 10). A fresh pallet 38 is placed in an upstanding position along the opposite edge of the platform 16 from the hinge pin 28 with the legs or boards 40 thereon extending vertically along the opposite side of the pallet 38 from the mold walls 22 and 24. Next, the mold walls 22 and 24 are moved so that the flanges 42 and 44 engage the pallet 38 opposite the legs 40. The eccentric clamps 46 and 48 are then moved about the ends of the pallet 38 and locked by means of the operating levers 52 so that the clamping arms 50 thereon press the pallet securely against the flanges 42 and 44. In the clamp position, just described, the mold walls 22 and 24, the pallet 38, and the platform 16 define a mold cavity into which mortar M or any other suitable material is poured.

Before the mortar M is poured into the mold cavity, the funnel member 54 (Fig. 11) is placed on top of the mold walls 22 and 24 with the wall 57 abutting the top portion of the pallet 38 and with the arms 58 and 60 thereon extending downwardly along the outside ends of the mold walls 22 and 24. The mortar is now poured into the mold cavity from above until the level of the mortar reaches a predetermined level on the walls of the funnel member 54.

The operator now places his fingers under the platform 16 from opposite ends thereof. At the same time he places his thumbs on the flanges 62 and 64 of the funnel arms 58 and 60 so that the pressure exerted by the operator between his thumbs and fingers holds the funnel member 54 securely onto the top of the mold walls 22 and 24. The operator now thumps the mold portion 12 on the support portion 14 by successively lifting and jarring said portion 12 thereon. The thumping operation causes the mortar M to settle into the mold cavity at approximately the level of the upper edges of the mold walls 22 and 24 (not the portions 22a and 24a).

After the mortar has been thumped, the operator takes hold of the arms 58 and 60 and the flanges 62 and 64 thereon and drags the funnel member 54 toward himself (leftwardly in Fig. 5) thereby leveling the top of the mortar in the cavity. The leveling is performed by an edge 59 on the funnel member 54 (Figs. 4 and 5). Fig. 4 shows the funnel member 54 in position for pouring the mortar M, and Fig. 5 shows the funnel member after it has been dragged about halfway across the mold walls 22 and 24 during the leveling or scraping process. After the first few blocks have been completed, the operator knows how much settling to expect from the mortar during thumping and thereafter he can fill the mold cavity very accurately so that very little waste results during the leveling operation.

Having filled, thumped, and leveled the mold cavity, the operator places a block of wood W on top of the mold walls 22 and 24 between the pallet 38 and the upwardly extending portion of the mold walls 22a and 24a (Figs. 6 and 12). The wooden block W is in a horizontal position on the leveled portion of the mortar M providing a small unfilled cavity with the upwardly extended portions 22a and 24a. When this small cavity is filled with mortar M and leveled, the mold portion 12, including the mortar contained therein, is overturned rearwardly (clockwise Fig. 12) so that the pallet 38 becomes the platform or bottom wall (Fig. 6). In the overturned position, the pivot stud 66 engages the underside of the bridge member 72 and only the rear wall 20 of the platform member 16 and the pallet 38 engage the upper edges of the walls 70 of the support portion 14.

The engagement of the pivot stud 66 and the bridge member 72 prevents the mold portion 12 from overturning more than 90 degrees from the upstanding position. Limiting the movement of the mold portion 12 in this manner prevents the mold walls 22 and 24, the hinge 26, and the platform 16 from falling on the soft mortar when they are removed therefrom.

If it is more desirable or economical to use a thinner pallet 38a (dotted lines Fig. 7) then it is necessary to provide support for the pallet when the mold portion 12 is overturned in order not to flex the pivot stud 66. The additional support is provided by means of the posts 74 which are threadedly adjustable to accommodate thinner pallets 38a.

In the overturned position, the operator loosens the clamps 46 and 48 and moves them outwardly to clear the ends of the pallet 38. By lifting the clamps 46 and 48 still further, the mold walls 22 and 24 rotate on the hinge 26 and come loose from the mortar M. When clear of the mortar, the whole mold portion 12 can be returned to its upstanding position and the procedure repeated for subsequent blocks. As soon as the mold portion 12 is upright the operator lifts the pallet 38 containing the block that has just been formed and places it on a conveyor system or in a suitable place to dry and harden. During drying the wooden block W supports the protruding portion of the rib R and prevents it from collapsing. When dry, the blocks can be easily separated from the pallet 38 and from the block of wood W.

Another way of making block B is to use mold walls 22 and 24 that have level upper edges throughout. Then, instead of placing the block of wood W on top of the mortar, the block W is placed in the bottom of the mortar cavity. When the cavity is filled with mortar and thumped in the same manner as above described, the funnel member 54 is dragged all the way across the upper level mold walls 22 and 24. The mold portion 12 is then ready to be overturned and separated from the pallet 38 and the block.

A double projecting ribbed block can be constructed by using a block of wood W at the top and at the bottom of the mold cavity and combining the procedures described above. It is also possible to form blocks having a rib portion that is shorter at one or both ends by using smaller blocks of wood (not shown) in the forward section of the cavity used with a level upper mold wall edge. Still further, it is possible to mold blocks having a rib that is even with the sides of the block without using any wooden blocks (Fig. 13).

Any of the block shapes described, or combinations thereof, can be constructed using the inventive block molding device and the operation technique described therefor.

The foregoing description and the accompanying drawings have been presented only by way of illustration and example, and changes or alterations in the present disclosure, which will be readily apparent to one skilled in the art are contemplated as within the scope of the present invention which is limited only by the claims which follow.

What I claim is:

1. A block molding device comprising a stationary platform with a bridge member extending thereacross; an unattached mold portion positioned on the stationary portion having a base member with a downwardly projecting stud thereon which is positioned adjacent to said bridge member and which is adapted to cooperate with said bridge member to limit angular displacement of the mold portion to 90 degrees relative to the stationary platform, a pair of mold walls hinged together and mounted in upstanding position on the base member for angular movement thereover, each of said mold walls having a clamp member attached to the opposite free end thereof; a pallet removably attached to said mold walls by the clamp members, said mold walls, said pallet, and said base member defining a mold cavity having an opening thereinto; and a funnel member positioned on the mold walls and having a shape that conforms to the shape of the opening into the mold cavity, said funnel member increasing the capacity of the mold cavity so as to hold an excess of molding material and including means thereon for holding said funnel member in position on the mold walls when the mold portion is jarred to settle the molding material, said funnel member having an edge thereon which is positioned to be drawn across the opening into the mold cavity for scraping the edge of the molding material adjacent thereto when removing the funnel member from the mold portion.

2. A block molding device comprising a stationary platform with a bridge member extending thereacross; an unattached mold portion positioned on the stationary platform having a base member with a downwardly projecting stud thereon which is positioned adjacent to said bridge member and which is adapted to cooperate with said bridge member to limit angular displacement of the mold portion to 90 degrees relative to the stationary platform, a pair of mold walls hinged together and mounted in upstanding position on the base member for angular movement thereover, each of said mold walls having a clamp member attached to the opposite free end thereof; a pallet removably attached to said mold walls by the clamp members, said mold walls, said pallet, and said base member defining a mold cavity having an opening thereinto; a funnel member removably positioned on the mold walls and having a shape that conforms to the shape of the opening into the mold cavity, said funnel member increasing the capacity of the mold cavity so as to hold an excess of molding material and including downwardly extending means thereon which enable said funnel member to be held in position on the mold walls when the mold portion is jarred to settle the molding material, said funnel member having an edge thereon which is positioned to be drawn across the opening into the mold cavity for scraping the edge of the molding material adjacent thereto when removing the funnel member from the mold portion; and threaded means on said stationary platform for supporting the mold portion when overturned 90 degrees thereon, said threaded means being adjustable to support mold portions having pallets of different thicknesses.

References Cited in the file of this patent

UNITED STATES PATENTS

| | | |
|---|---|---|
| 856,340 | Edmondson | June 11, 1907 |
| 967,020 | Kalvig | Aug. 9, 1910 |
| 1,058,170 | Folden | Apr. 8, 1913 |
| 1,516,710 | Caputo | Nov. 25, 1925 |
| 2,069,880 | Gelbman et al. | Feb. 9, 1937 |
| 2,227,756 | Kirkham | Jan. 7, 1941 |
| 2,560,722 | Godefroid | July 17, 1951 |

FOREIGN PATENTS

| | | |
|---|---|---|
| 172,855 | Great Britain | Dec. 22, 1921 |
| 535,083 | France | Jan. 18, 1922 |
| 590,906 | France | Mar. 27, 1925 |
| 50,469 | France | Apr. 16, 1940 |